(12) United States Patent  
Tsuji (10) Patent No.: US 8,411,856 B2  
(45) Date of Patent: Apr. 2, 2013

(54) IMAGE FORMING APPARATUS, COMPUTER READABLE MEDIUM AND MEDIUM

(75) Inventor: Masato Tsuji, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/303,901

(22) Filed: Nov. 23, 2011

(65) Prior Publication Data

US 2012/0069999 A1      Mar. 22, 2012

Related U.S. Application Data

(62) Division of application No. 12/138,072, filed on Jun. 12, 2008, now abandoned.

(30) Foreign Application Priority Data

Nov. 8, 2007   (JP) .................................. 2007-290977

(51) Int. Cl.  
*H04L 9/00*   (2006.01)

(52) U.S. Cl. .......................................................... 380/46

(58) Field of Classification Search ...................... 380/46  
See application file for complete search history.

(56) References Cited

U.S. PATENT DOCUMENTS

| | | | |
|---|---|---|---|
| 5,257,119 A | | 10/1993 | Funada et al. |
| 5,465,161 A | | 11/1995 | Funada et al. |
| 5,504,835 A | * | 4/1996 | Yoshikawa et al. ........... 704/258 |
| 5,737,100 A | | 4/1998 | Funada et al. |
| 5,742,408 A | | 4/1998 | Funada et al. |
| 6,137,590 A | * | 10/2000 | Mori ............................ 358/1.17 |
| 6,570,990 B1 | * | 5/2003 | Kohn et al. .................... 380/213 |
| 6,951,692 B1 | | 10/2005 | Das et al. |
| 2006/0056623 A1 | * | 3/2006 | Gligor et al. .................... 380/28 |
| 2006/0291701 A1 | * | 12/2006 | Tanaka ........................... 382/115 |
| 2009/0292918 A1 | | 11/2009 | Mori et al. |

FOREIGN PATENT DOCUMENTS

| | | |
|---|---|---|
| JP | 04-294682 A | 10/1992 |
| JP | 5-064194 A | 3/1993 |
| JP | 7-226979 A | 8/1995 |
| JP | 2006-323962 A | 11/2006 |
| JP | 2007-195155 A | 8/2007 |
| WO | WO 2007099716 A1 | 9/2007 |

OTHER PUBLICATIONS

English translation of Japanese Office Action dated Jan. 5, 2010 for Japanese Appln. No. 2007-290977.  
Japanese Office Action dated Mar. 1, 2011 for corresponding Japanese patent application No. 2010-049646.

* cited by examiner

*Primary Examiner* — Kambiz Zand  
*Assistant Examiner* — Dant Shaifer Harriman  
(74) *Attorney, Agent, or Firm* — Sughrue Mion, PLLC (57) ABSTRACT

The image forming apparatus includes: a random number information generation part that generates random number information; a first encryption part that encrypts the random number information generated by the random number information generation part with using a first encryption key; a second encryption key generation part that newly generates a second encryption key from the random number information generated by the random number information generation part; a second encryption part that encrypts specific information for identifying the apparatus with using the second encryption key generated by the second encryption key generation part; a code data creation part that creates code data based on encrypted random number information encrypted by the first encryption part and encrypted specific information encrypted by the second encryption part; and an image forming part that forms a code image based on the code data created by the code data creation part on a recording medium.

5 Claims, 9 Drawing Sheets

IMAGE FORMING APPARATUS, COMPUTER READABLE MEDIUM AND MEDIUM

CROSS REFERENCE TO RELATED APPLICATIONS

This application is a Divisional of U.S. application Ser. No. 12/138,072 filed Jun. 12, 2008, which claims priority under 35 USC §119 from Japanese Patent Application No. 2007-290977 filed Nov. 8, 2007. The contents of the prior applications are incorporated by reference in their entirety.

BACKGROUND

1. Technical Field

The present invention relates to an image forming apparatus that forms an image on a recording medium, a computer readable medium storing a program and a medium.

2. Related Art

Conventionally, in an image forming apparatus that electrically processes a full-color image signal and acquires an output image signal, an image forming apparatus that adds a specific pattern (a code image) to the output signal has been proposed.

SUMMARY

According to an aspect of the invention, there is provided an image forming apparatus including: a random number information generation part that generates random number information; a first encryption part that encrypts the random number information generated by the random number information generation part with using a first encryption key; a second encryption key generation part that newly generates a second encryption key from the random number information generated by the random number information generation part; a second encryption part that encrypts specific information for identifying the apparatus with using the second encryption key generated by the second encryption key generation part; a code data creation part that creates code data based on encrypted random number information encrypted by the first encryption part and encrypted specific information encrypted by the second encryption part; and an image forming part that forms a code image based on the code data created by the code data creation part on a recording medium.

BRIEF DESCRIPTION OF THE DRAWINGS

Exemplary embodiment (s) of the present invention will be described in detail based on the following figures, wherein.

DETAILED DESCRIPTION

Hereinafter, with reference to the accompanying drawings, the exemplary embodiments for carrying out the present invention is described in detail.

First Exemplary Embodiment

Figure 1:
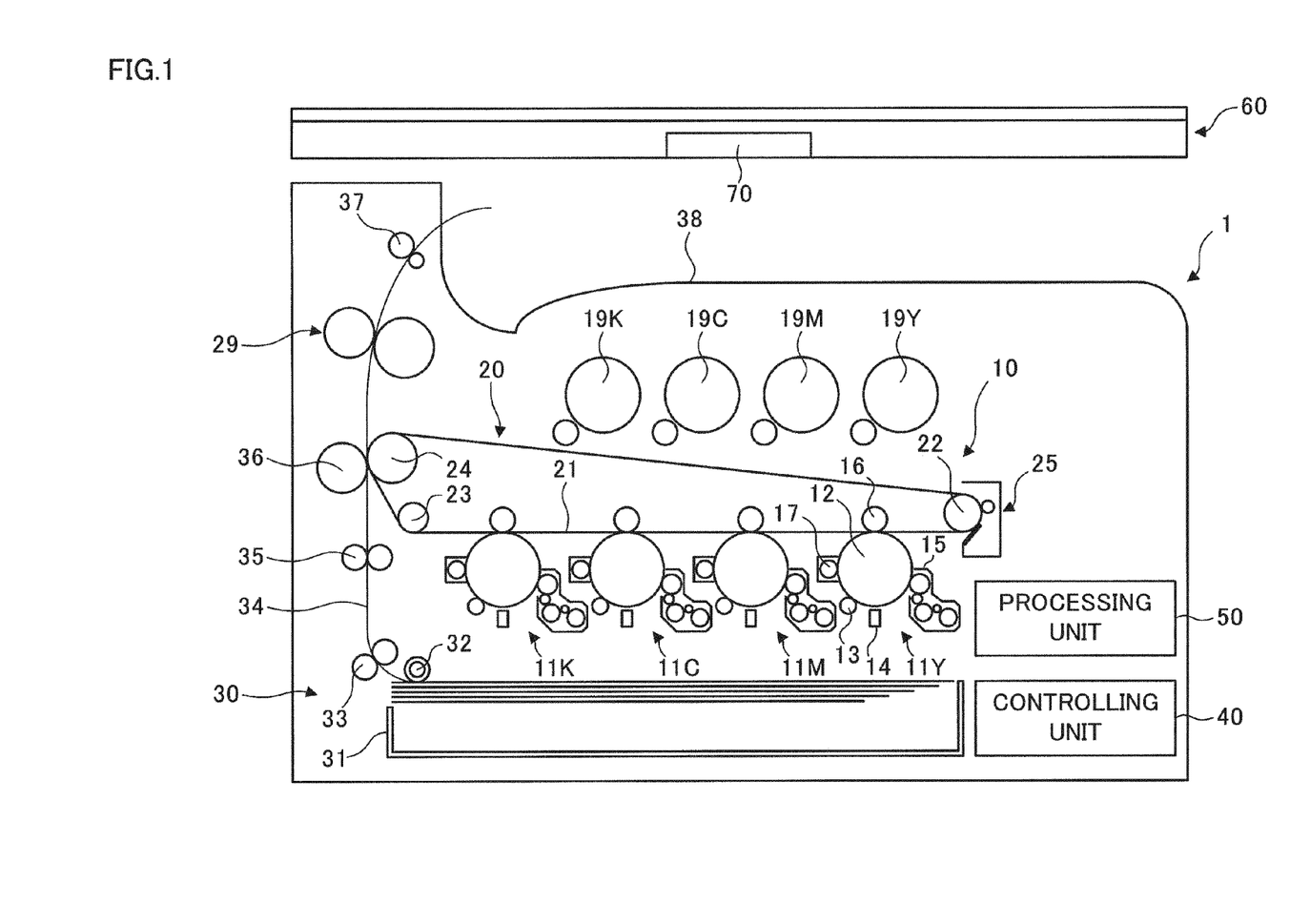
FIG. 1 is a diagram illustrating an entire configuration of an image forming apparatus to which the first exemplary embodiment is applied.

FIG. 1 is a diagram illustrating an entire configuration of an image forming apparatus to which the first exemplary embodiment is applied. The image forming apparatus is provided with a printer unit 1 and a scanner unit 60. The printer unit 1 is provided with an image forming process system 10, a sheet transportation system 30, a controlling unit 40 and a processing unit 50.

The image forming process system 10 forms an image on the basis of respective color image data created by the processing unit 50. The sheet transportation system 30 transports a sheet as a recording medium (a medium) in accordance with operation of the image forming process system 10. The controlling unit 40 controls operation of the printer unit 1 and the scanner unit 60. The processing unit 50 is connected to a client including the scanner unit 60, a PC (personal computer) (not illustrated in the figure) and the like, processes received print data, converts the processed data into the respective color image data used in the image forming process system 10 and outputs them. It should be noted that FIG. 1 is a diagram where the image forming apparatus is seen from the front side. On the front side of the scanner unit 60, a UI (user interface) 70 is provided. The UI 70 receives an instruction of operation by a user and notifies a user of information.

The image forming process system 10 is provided with four image forming units, that is, a yellow image forming unit (Y unit) 11Y, a magenta image forming unit (M unit) 11M, a cyan image forming unit (C unit) 11C and a black image forming unit (K unit) 11K, and a transfer unit 20. The Y unit 11Y, the M unit 11M, the C unit 11C and the K unit 11K are arranged in parallel at a predetermined interval in the horizontal direction.

Each of the image forming units 11 (11Y, 11M, 11C and 11K) that functions as an image forming part is provided with a photoconductor drum 12 arranged to be rotatable. Around the photoconductor drum 12, an charging device 13, an exposure device 14, a development device 15, a primary transfer roll 16, a cleaning unit 17 and the like are sequentially arranged. Among these, the charging device 13 charges the photoconductor drum 12 with a predetermined potential. The exposure device 14 selectively emits a light beam on the photoconductor drum 12 that has been charged with a predetermined potential by the charging device 13 and forms an electrostatic latent image. The development device 15 stores corresponding color toner (for example, yellow toner in the Y unit 11Y), and develops the electrostatic latent image on the photoconductor drum 12 with the toner.

The primary transfer roll 16 primarily transfers a toner image formed on the photoconductor drum 12 by an applied primary transfer bias, to an intermediate transfer belt 21. The cleaning unit 17 removes the residues (toner and the like) on the photoconductor drum 12 after the primary transfer. Here, in the first exemplary embodiment, the exposure device 14 is configured by a LED print head formed by arranging many LEDs (Light Emitting Diodes) in a main scanning direction, for example. It should be noted that, as the exposure device 14, a scanning exposure device including, for example, a LD (Laser Diode), a polygon mirror and the like may be used.

On the upper side of the image forming units 11 (11Y, 11M, 11C and 11K) across the intermediate transfer belt 21, four toner cartridges 19 (19Y, 19M, 19C and 19K) are provided. Each of the toner cartridges 19 (19Y, 19M, 19C and 19K) supplies color toner to the corresponding development device 15 provided in each of the image forming units 11 (11Y, 11M, 11C and 11K) of the corresponding color.

The transfer unit 20 is provided with the intermediate transfer belt 21, a driving roll 22, a tension roll 23, a back-up roll 24 and a belt cleaner 25. Among these, the intermediate transfer belt 21 is supported and held to be rotatable by the driving roll 22, the tension roll 23 and the back-up roll 24. The driving roll 22 drives and rotates the intermediate transfer belt 21, while holding the intermediate transfer belt 21.

The tension roll 23 is driven and rotated by the intermediate transfer belt 21 that is driven by the driving roll 22, while applying a predetermined tension to the intermediate transfer belt 21 by holding the intermediate transfer belt 21. The back-up roll 24 functions as a component member of a secondary transfer part described below, while holding the intermediate transfer belt 21. The belt cleaner 25 is attached to a position that is opposed to the driving roll 22 while the intermediate transfer belt 21 is sandwiched in between, and removes residues (toner and the like) on the intermediate transfer belt 21 after the secondary transfer.

The sheet transportation system 30 is provided with a sheet feeding unit 31, a pick-up roll 32, feeding rolls 33, a transporting route 34, resist rolls 35, a secondary transfer roll 36, exit rolls 37 and an exit unit 38. In addition, between the secondary transfer roll 36 and the exit rolls 37, a fixing device 29 that fixes the secondary-transferred toner image on the sheet with heat and pressure is provided.

The sheet feeding unit 31 stacks sheets on which images are to be formed. The pick-up roll 32 takes out sheets stacked on the sheet feeding unit 31 and supplies them. The feeding rolls 33 separate the sheets taken out by the pick-up roll 32 one by one, and transport the sheet to the transporting route 34. The resist rolls 35 stop the sheet transported from the transporting route 34 once, and then transport it to a secondary transfer position (the secondary transfer part) at a right timing. The secondary transfer roll 36 configures the secondary transfer part with the back-up roll 24, and secondarily transfers the image on the intermediate transfer belt 21 to the surface of the transported sheet. The exit rolls 37 discharge the sheet on which the image is fixed by the fixing device 29 to the outside of the apparatus. The exit unit 38 is provided on the upper side of the printer unit 1, and stacks sheets that have been recorded, and have been discharged by the exit rolls 37.

Meanwhile, in the scanner unit 60, an image of a manuscript put on a platen glass or an image of a manuscript transported on the platen glass is read by a CCD image sensor or the like (not illustrated in the figure). In the first exemplary embodiment, in the scanner unit 60, an image formed on a manuscript may be read out in full-color.

Figure 2:
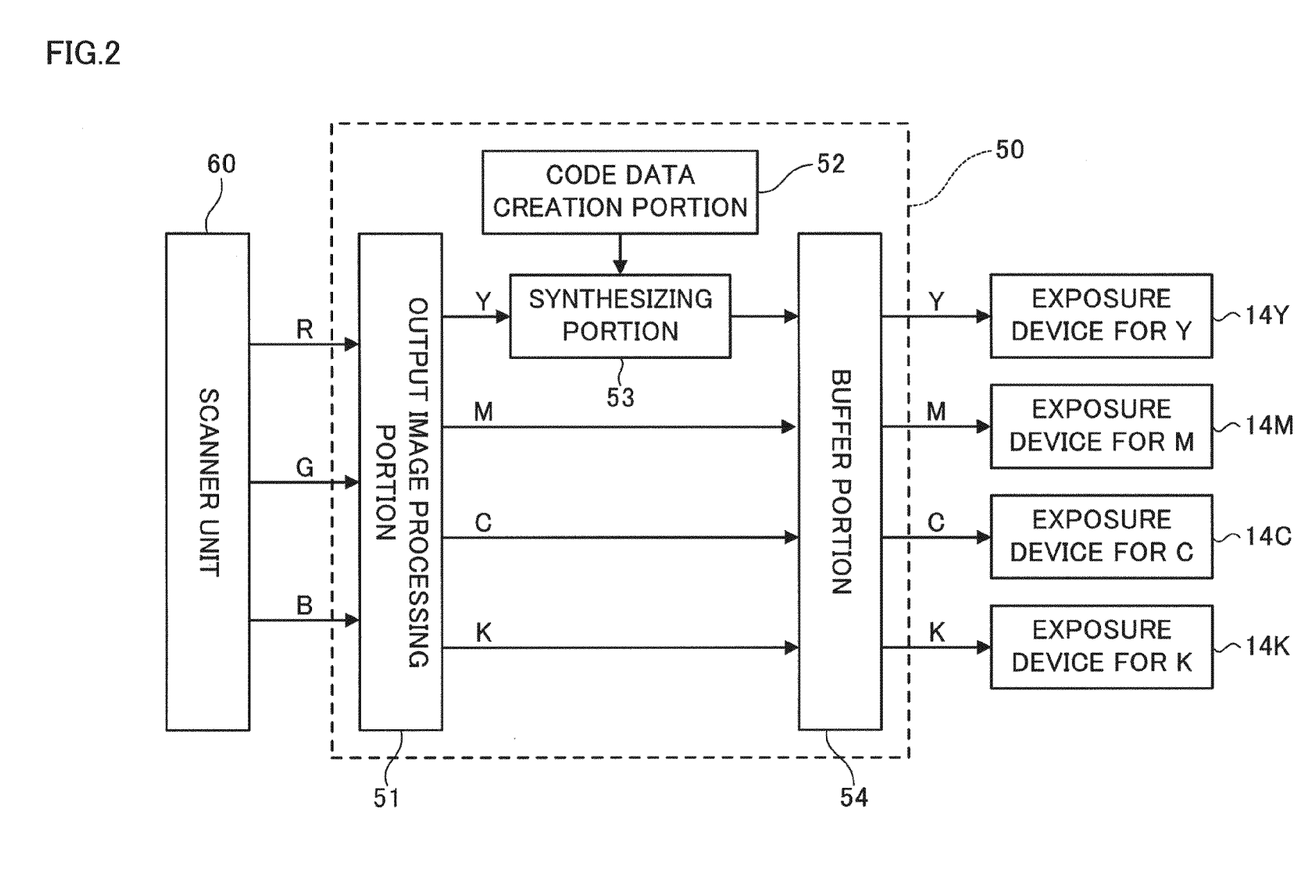
FIG. 2 is a block diagram illustrating a configuration of the processing unit provided in the printer unit.

FIG. 2 is a block diagram illustrating a configuration of the processing unit 50 provided in the printer unit 1. The processing unit 50 is provided with an output image processing portion 51, a code data creation portion 52, a synthesizing portion 53 and a buffer portion 54.

The output image processing portion 51 conducts predetermined image processing on read-out data inputted from the scanner unit 60 for example, and outputs the data as image data. In the first exemplary embodiment, color read-out data of red (R), green (G), and blue (B) inputted from the scanner unit 60 are color-converted in the output image processing portion 51 and resultant data are outputted as full-color image data of yellow (Y), magenta (M), cyan (C) and black (K).

The code data creation portion 52 creates code data in which specific information of the printer unit 1 including, for example, a division code where the printer unit 1 is located, an installation place, printed time, and further, a maker name is encrypted, and then outputs the data to the synthesizing portion 53.

On the other hand, in the synthesizing portion 53, among the respective color image data outputted from the output image processing portion 51, the yellow image data and the code data transmitted from the code data creation portion 52 are synthesized and outputted to the buffer portion 54.

The buffer portion 54 temporarily stores the yellow image data inputted from the output image processing portion 51 via the synthesizing portion 53 and the respective color image data of magenta, cyan and black directly inputted from the output image processing portion 51, and outputs them to an exposure device 14Y for Y, an exposure device 14M for M, an exposure device 14C for C, and an exposure device 14K for K at a predetermined timing. Therefore, in the M unit 11M, the C unit 11C, and the K unit 11K, respective color toner images are formed on the basis of the read-out result by the scanner unit 60. On the other hand, in the Y unit 11Y, a yellow color toner image is formed on the basis of the read-out result by the scanner unit 60 and the code data from the synthesizing portion 53. In this way, the code data in the first exemplary embodiment is made as a toner image using yellow, which is the color material in the color that is difficult to be recognized by human eyes.

Figure 3:
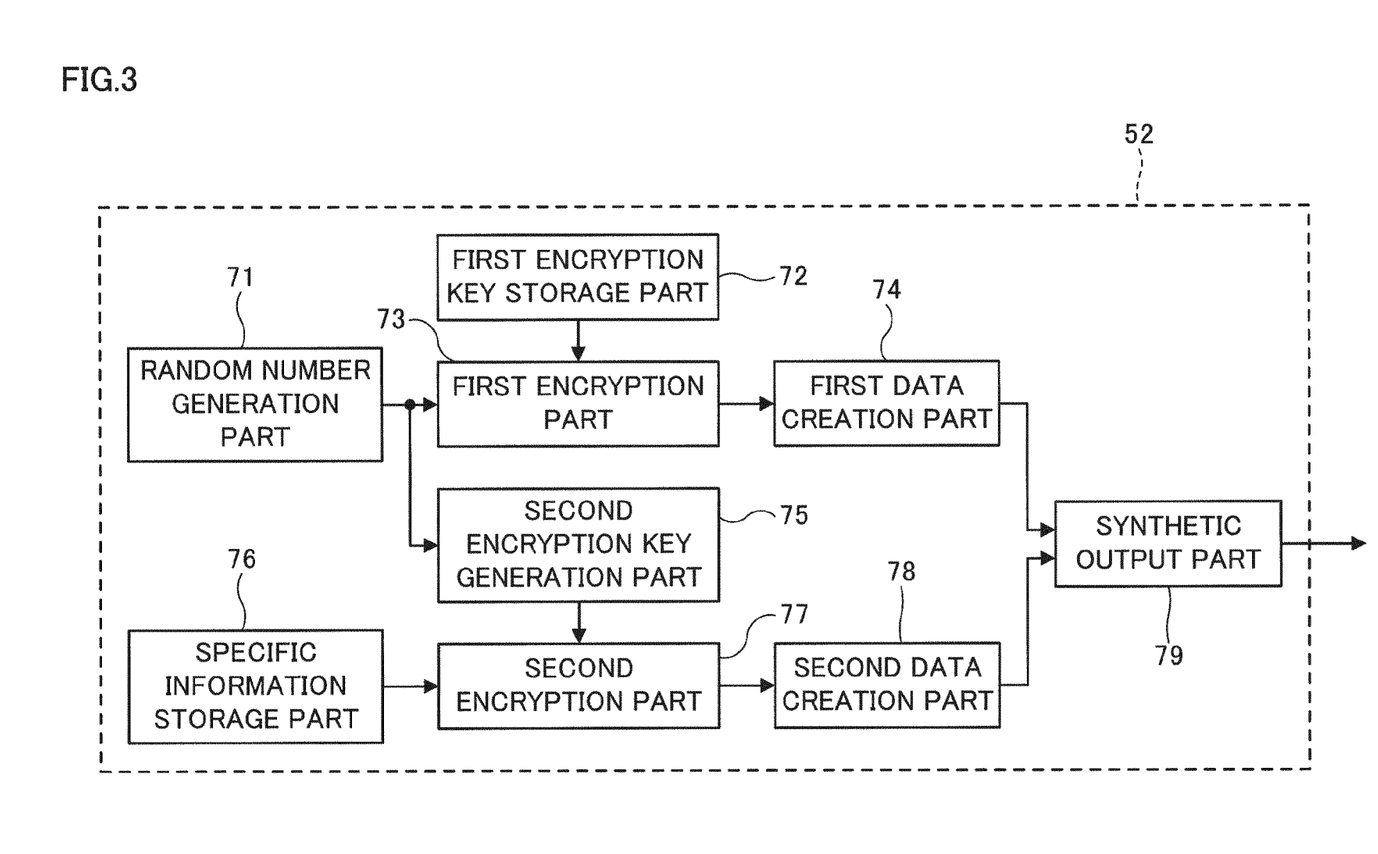
FIG. 3 is a block diagram for explaining a detail of the above-mentioned code data creation portion.

FIG. 3 is a block diagram for explaining a detail of the above-mentioned code data creation portion 52. The code data creation portion 52 is provided with a random number generation part 71, a first encryption key storage part 72, a first encryption part 73, a first data creation part 74, a second encryption key generation part 75, a specific information storage part 76, a second encryption part 77, a second data creation part 78 and a synthetic output part 79.

The random number generation part (a random number information generation part) 71 generates a random number and outputs the generated random number. For the random number generation part 71 in the first exemplary embodiment, a pseudo random number generator used in general may be used. Here, the random number generation part 71 may generate a random number per predetermined time (1 minute, for example). In this case, the random number outputted from the random number generation part 71 may be made different depending on predetermined time. Further, for example, when an image is formed on a new sheet by each image forming unit 11, the random number generation part 71 may generate and output a random number. In other words, every time transportation of a sheet is started, a random number may be generated and outputted.

The first encryption key storage part 72 functions as a memory that stores information on an encryption key (referred to as a first encryption key) for encrypting the random number outputted from the random number generation part 71.

The first encryption part 73 encrypts the random number inputted from the random number generation part 71 with using the first encryption key read out from the first encryption key storage part 72.

The first data creation part 74 creates first image data (data of a code image) on the basis of encrypted random number encrypted by the first encryption part 73.

The second encryption key generation part 75 generates a new encryption key (referred to as a second encryption key)

for encrypting the specific information on the basis of the random number inputted from the random number generation part 71.

The specific information storage part 76 includes, for example, a ROM (Read Only Memory) and the like, and stores a division code, an installation place, a maker, a printed time and the like, which are the specific information of the image forming apparatus (the printer unit 1) described above. The specific information storage part 76 may also store specific ID, a serial number and the like of the image forming apparatus as the specific information. Further, the specific information storage part 76 may be constituted by a rewritable flash ROM or the like so as to store information on the installation place and the like of the image forming apparatus acquired by GPS (Global Positioning System).

The second encryption part 77 encrypts the specific information of the printer unit 1 read out from the specific information storage part 76 with using the second encryption key generated in the second encryption key generation part 75.

The second data creation part 78 creates second image data (data of a code image) on the basis of encrypted specific information encrypted by the second encryption part 77. Therefore, in the first exemplary embodiment, the above-mentioned first data creation part 74 and the second data creation part 78 function as the code data creation part that creates the code data.

The synthetic output part 79 creates code data by synthesizing the first image data created by the first data creation part 74 and the second image data created by the second data creation part 78, and outputs the data to the synthesizing portion 53 (refer to FIG. 2).

The first encryption key stored in the first encryption key storage part 72 and a generation formula of the second encryption key used in the second encryption key generation part 75 are not disclosed and kept secret.

Here, the code data creation portion 52 may be configured by a computer device. A program executed by the computer may be stored in a recording medium in which the program is recorded so as to be readable by the computer. As the recording medium, for example, a CD-ROM medium or the like is exemplified. Further, the program may be read out by a CD-ROM reading apparatus in the computer, stored in, for example, various kinds of memories such as a hard disk, and executed. In addition, the program may be provided to a note PC and a mobile terminal through a network by, for example, a program transmission device. As the program transmission device, it is only necessary to include a memory in which a program is stored and a program transmission unit that supplies a program through a network.

Next, an image forming operation by the printer unit 1 will be described.

When read-out data are inputted from the scanner unit 60 for example, upon a print instruction or the like from a user, the read-out data is processed by the processing unit 50. In the output image processing portion 51 of the processing unit 50, image data (data for exposure) of respective visible colors (YMCK) are created on the basis of the read-out data (RGB). Among them, the image data of magenta (M), cyan (C) and black (K) are transmitted to the buffer portion 54 as they are and temporarily stored in the buffer portion 54. On the other hand, the yellow image data are synthesized, in the synthesizing portion 53, with the code data outputted from the code data creation portion 52, transmitted to the buffer portion 54, and temporarily stored in the buffer portion 54 similarly.

At this time, in the code data creation portion 52, the following processing is executed. When the read-out data is inputted to the output image processing portion 51, the first encryption part 73 encrypts the random number generated in the random number generation part 71, with using the first encryption key read out from the first encryption key storage part 72. Then, the first data creation part 74 creates the first image data on the basis of the encrypted random number (encrypted random number information).

The second encryption key generation part 75 generates the second encryption key on the basis of the random number generated by the random number generation part 71. Next, the second encryption part 77 encrypts the specific information read out from the specific information storage part 76 with using the second encryption key generated in the second encryption key generation part 75. Then, the second data creation part 78 creates the second image data on the basis of the encrypted specific information. After that, the first image data created in the first data creation part 74 and the second image data created in the second data creation part 78 are synthesized in the synthetic output part 79 and the resultant data are outputted as the code data. At this time, the random numbers used in the first encryption part 73 and the second encryption key generation part 75 are identical.

The respective color image data stored in the buffer portion 54 as above are outputted to the corresponding exposure devices 14Y for Y, 14M for M, 14C for C and 14K for K at a predetermined timing, respectively.

In each of the image forming units 11 (11Y, 11M, 11C and 11K), the photoconductor drum 12 is charged by the charging device 13 with a predetermined potential. In each of the exposure devices 14, the corresponding LED emits light according to the image data inputted from the processing unit and irradiates the photoconductor drum 12. By this arrangement, in each photoconductor drum 12, a charged surface is selectively exposed, and an electrostatic latent image is formed. The formed electrostatic latent image is developed as each of color toner images of yellow (Y), magenta (M), cyan (C) and black (K) in each development device 15.

The toner images formed on the respective photoconductor drums 12 of the respective image forming units 11 are multi-transferred to the intermediate transfer belt 21. At this time, the black image forming unit 11K that forms a black toner image is arranged on the most downstream side in the moving direction of the intermediate transfer belt 21, and the black toner image is primarily transferred to the intermediate transfer belt 21 at the last. The photoconductor drum 12 after the transfer is cleaned by the cleaning unit 17.

On the other hand, in the sheet transportation system 30, the pick-up roll 32 is rotated according to the timing of image formation and a sheet with a predetermined size is supplied from the sheet feeding unit 31. The sheet separated one by one by the feeding rolls 33 reaches the resist roll 35 via the transporting route 34 and is stopped once. After that, according to the moving timing of the intermediate transfer belt 21 on which the toner image is formed, the resist roll 35 is rotated and the sheet is transported to the secondary transfer position formed by the back-up roll 24 and the secondary transfer roll 36.

To the sheet transported from below to above at the secondary transfer position, a toner image in which four colors are superposed is sequentially transferred in a sub-scanning direction with using a pressing force and a predetermined electric field. Further, the sheet on which the respective color toner images have been transferred is subjected to the fixing processing with heat and pressure by the fixing device 29 and then, discharged to the exit unit 38 provided on an upper part of the main body, by the exit rolls 37. On the other hand, the intermediate transfer belt 21 after the secondary transfer is cleaned by the belt cleaner 25 and prepares for the subsequent process.

As mentioned above, on the exit unit 38, a sheet on which an image (a certain image) of the respective visible colors (YMCK) created on the basis of the read-out data and a yellow (Y) image created on the basis of the code data are formed, that is, a printed material is outputted.

Figure 4:
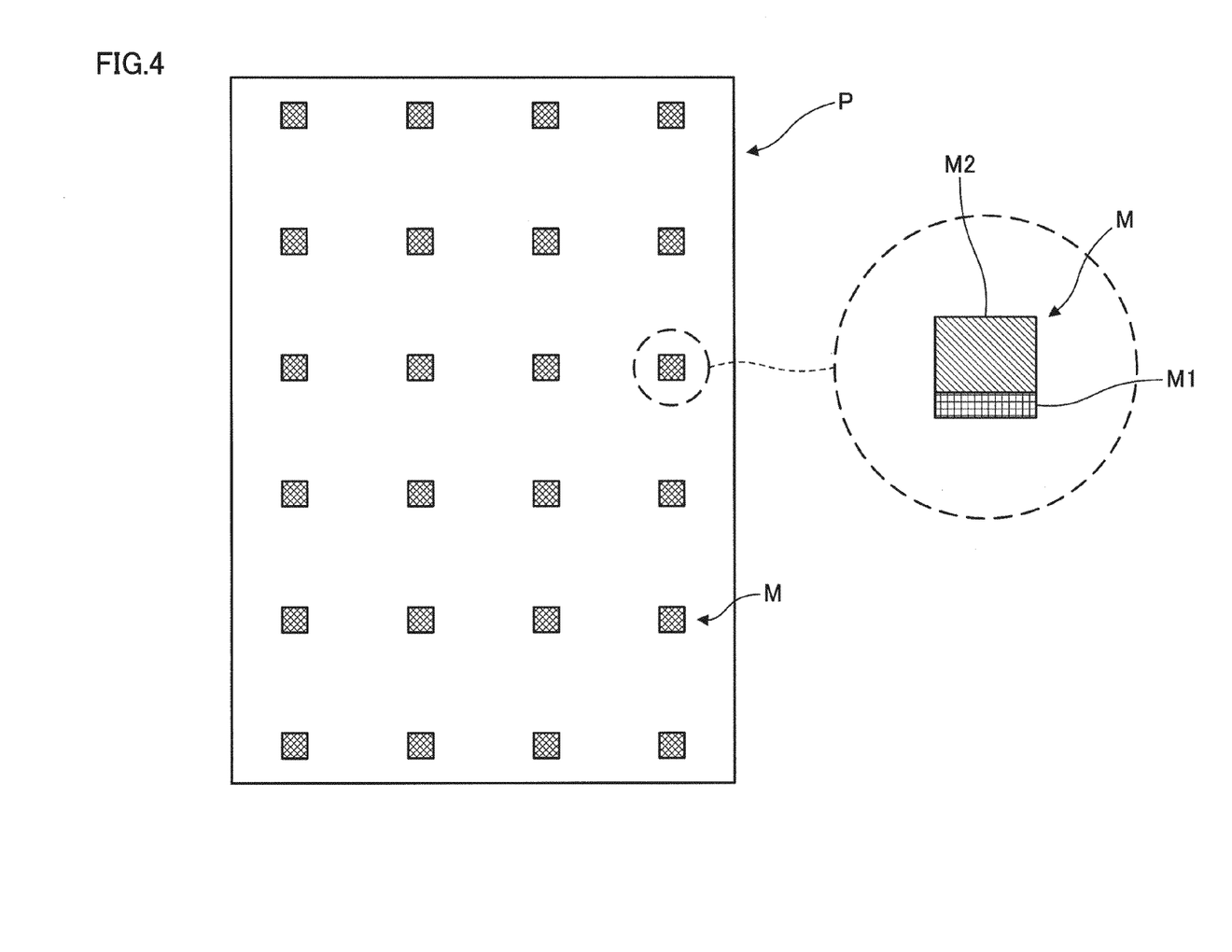
FIG. 4 illustrates an example of a printed material that is outputted.

Here, FIG. 4 illustrates an example of a printed material that is outputted. However, in FIG. 4, the image of the respective visible colors on the basis of the image data is omitted but only the code images M made of the yellow image created on the basis of the code data is shown as an example.

The plural code images M are formed with a given interval on a sheet P. Each of the code images M is provided with a first mark M1 corresponding to the above-mentioned first image data and a second mark M2 corresponding to the above-mentioned second image data. Here, the first mark M1 includes the encrypted random number, while the second mark M2 includes the encrypted specific information. Each of the code images M is formed by a small dot or a fine line, which is difficult to be visually recognized, for example. More specifically, when each of the code image M is formed on the basis of the binary number for example, it is formed by using a small dot or a fine line for a portion corresponding to one (1).

There is a request that a user desires to know the time when the printed material that was outputted in such a way was outputted and the place where the printed material was outputted. The request may be desired in a case, for example, where reproduction of a manuscript that is an original of the printed material is restricted or prohibited. In the first exemplary embodiment, the code images M given to the above-mentioned printed material is read out and analyzed so as to satisfy such a request.

Figure 5:
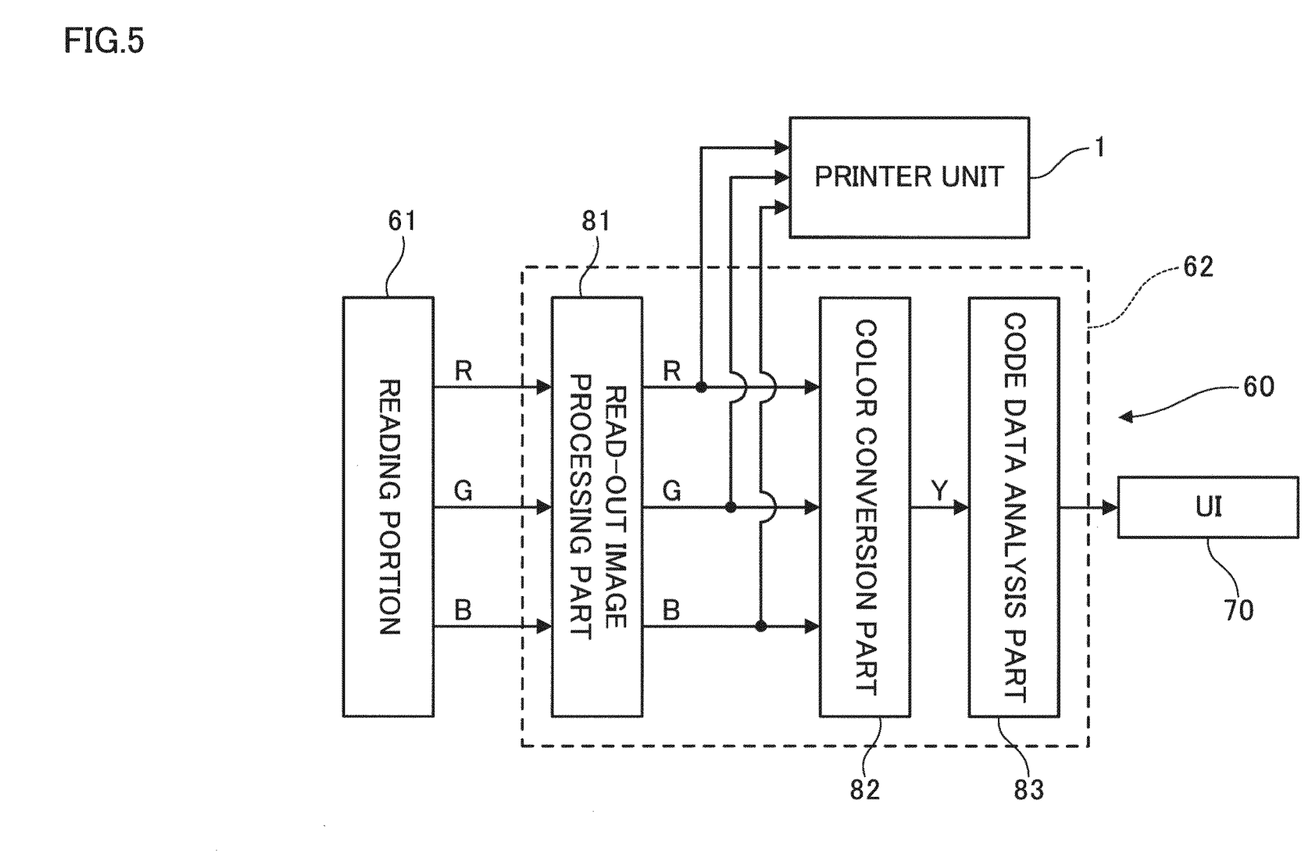
FIG. 5 is a block diagram illustrating a configuration of the scanner unit provided in the image forming apparatus.

FIG. 5 is a block diagram illustrating a configuration of the scanner unit 60 provided in the image forming apparatus. The scanner unit 60 is provided with a reading portion 61 and a reading processing portion 62.

The reading portion 61 is provided with three line sensors that are readable of images of red (R), green (G) and blue (B) on the printed material for example, and outputs the read-out data of red, green and blue.

The reading processing portion 62 is provided with a read-out image processing part 81, a color conversion part 82, and a code data analysis part 83.

The read-out image processing part 81 conducts predetermined image processing on the read-out data of respective colors (RGB) inputted from the reading portion 61. The predetermined image processing includes shading correction, tone correction or the like, for example. In the first exemplary embodiment, the respective color image data of RGB which have been subjected to various kinds of image processing in the read-out image processing part 81 are outputted to the printer unit 1.

The color conversion part 82 converts the respective color image data of RGB which has been subjected to various kinds of image processing in the read-out image processing part 81, to image data of YMCK in a different color space. The image data of YMCK which has been subjected to color conversion processing in the color conversion part 82 may be outputted to the printer unit 1.

The code data analysis part 83 takes out the code data from the yellow (Y) image data in the respective color image data of YMCK which are color-converted in the color conversion part 82, for analysis. Then, the code data analysis part 83 outputs the specific information of the image forming apparatus acquired by the analysis to the UI 70. The UI 70 displays the inputted specific information on a display or the like.

Figure 6:
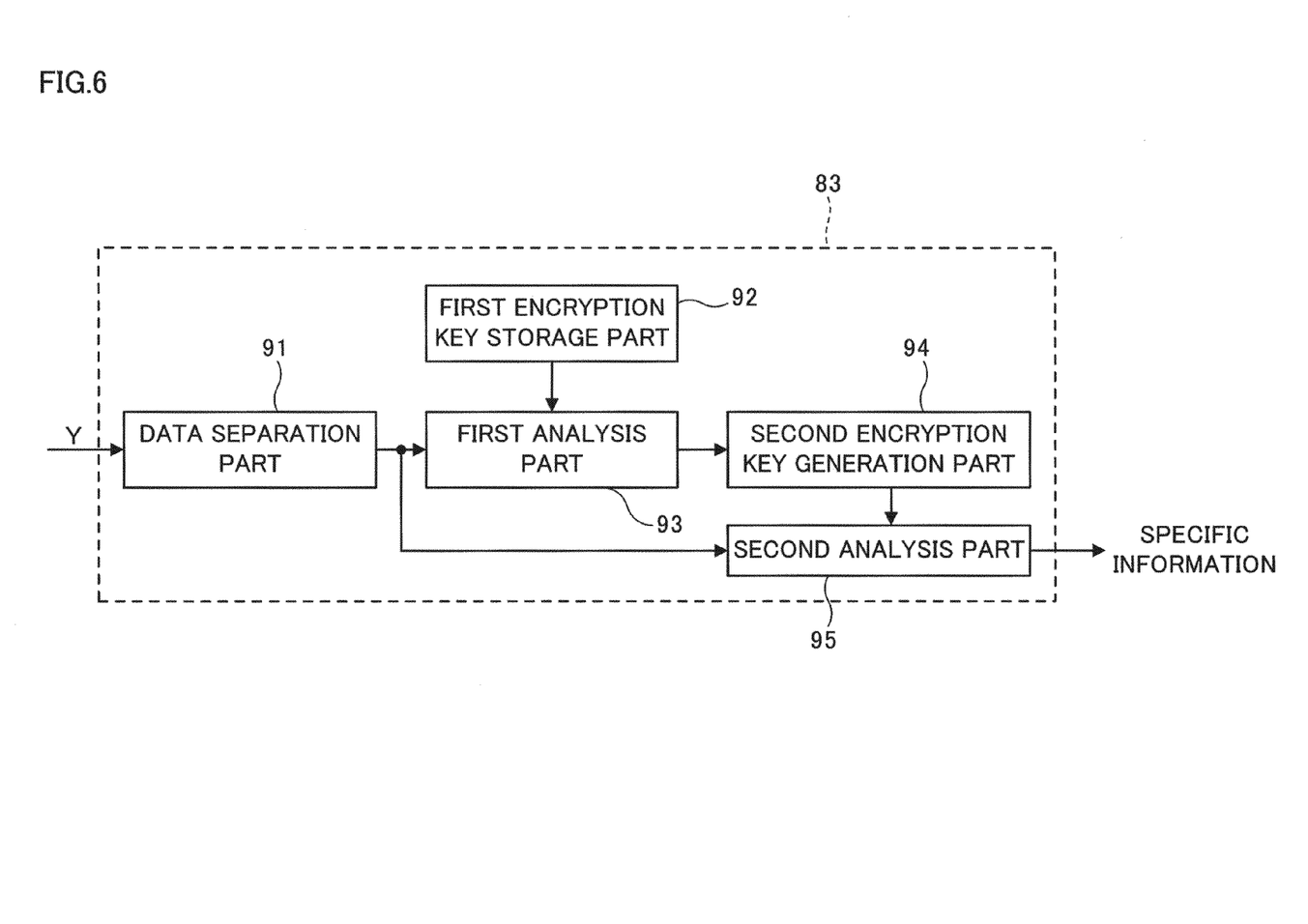
FIG. 6 illustrates a block diagram of the above-mentioned code data analysis part.

FIG. 6 illustrates a block diagram of the above-mentioned code data analysis part 83. The code data analysis part 83 is provided with a data separation part 91, a first encryption key storage part 92, a first analysis part 93, a second encryption key generation part 94 and a second analysis part 95.

The data separation part 91 separates the code data included in the inputted yellow (Y) image data, that is, the code image M (including the first mark M1 and the second mark M2), and outputs it.

The first encryption key storage part 92 stores information of a first encryption key that decodes the random number included in the code data (specifically, data of the first mark M1). The first encryption key storage part 92 stores the first encryption key same as that of the first encryption key storage part 72 (refer to FIG. 3) of the code data creation portion 52 (refer to FIG. 2).

The first analysis part 93 decodes the inputted code data (specifically, the data of the first mark M1) with using the first encryption key read out from the first encryption key storage part 92 and acquires a random number.

The second encryption key generation part 94 as a encryption key generation part generates the second encryption key that decodes the specific information included in the code data (specifically, data of the second mark M2) on the basis of the random number outputted from the first analysis part 93. Therefore, the second encryption key generation part 94 generates the second encryption key with using the generation formula same as that of the second encryption key generation part 75 of the code data creation portion 52.

The second analysis part 95 decodes the inputted code data (specifically, the data of the second mark M2) with using the second encryption key generated in the second encryption key generation part 94 and outputs the specific information thus acquired.

A specific information acquiring operation in the printed material by using the scanner unit 60 will be described below.

When the printed material is read out in the reading portion 61, the read-out data of three colors of RGB is inputted to the reading processing portion 62. In the reading processing portion 62, after the read-out data of respective colors of RGB is subjected to image processing in the read-out image processing part 81, color conversion processing is carried out in the color conversion part 82, and the resultant data are outputted as the image data of YMCK. Then, analysis is made in the code data analysis part 83 with using the yellow image data and the specific information thus acquired is displayed on the UI 70.

In the code data analysis part 83, after the data separation part 91 separates the code data from the yellow image data, the first analysis part 93 decodes the code data with using the first encryption key, and as a result, the random number in the code data is acquired. Next, the second encryption key generation part 94 generates the second encryption key with using the acquired random number. Moreover, the second analysis part 95 decodes the code data with using the second encryption key, and as a result, the specific information in the code data is acquired. As mentioned above, various kinds of information (the division code, the installation place, the maker name and the printed time in the first exemplary embodiment) of the image forming apparatus (the printer unit 1, for example) that outputs the printed material is acquired.

In the first exemplary embodiment, reading and analysis of the code image M in a printed material are carried out by using the scanner unit 60 configuring the image forming apparatus together with the printer unit 1. However, it is not limited to the above configuration. For example, an independent scanner may be used. The reading of the printed material is sufficient as long as the code image M on the printed material is read out for example, and a pen-type scanner, a portable scanner or the like capable of only at least a partial part of the printed material may be used. Moreover, since the analysis of the code data on the basis of the read-out result of the code image M is not always required to be carried out in the scanner unit 60, a computer such as a personal computer may be connected to the scanner unit 60 for example, so that the code data are analyzed by the computer side.

Second Exemplary Embodiment

Next, the second exemplary embodiment will be described. In the first exemplary embodiment, the specific information is encrypted. However, in the second exemplary embodiment, the specific information is converted into plural pattern data, and the plural pattern data thus acquired are rearranged with using a random number. It should be noted that, in the second exemplary embodiment, with respect to a unit having the same function as that in the first exemplary embodiment, the same reference numeral is attached and the detail description is omitted.

Figure 7:
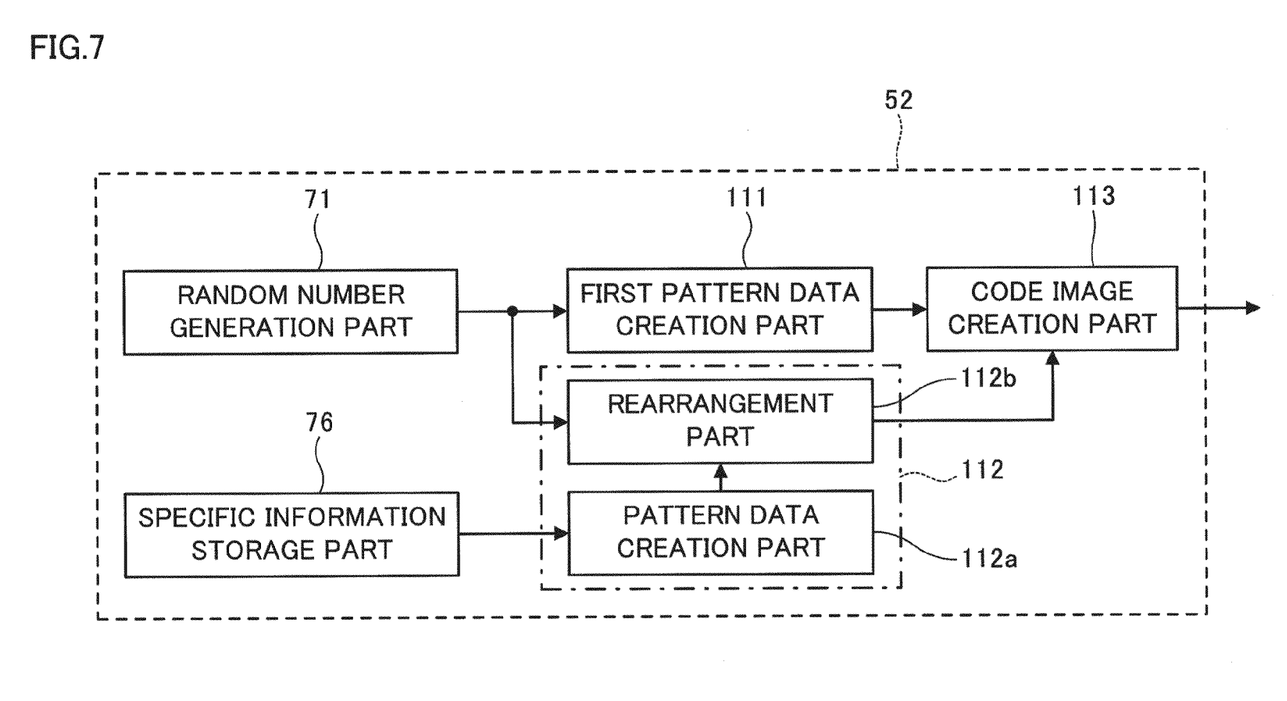
FIG. 7 is a block diagram for explaining a detail of a code data creation portion in the second exemplary embodiment.

FIG. 7 is a block diagram for explaining a detail of a code data creation portion 52 in the second exemplary embodiment. The code data creation portion 52 is provided with a random number generation part 71, a specific information storage part 76, a first pattern data creation part 111, a second pattern data creation part 112 and a code image creation part (a code data creation part) 113. It should be noted that, the second pattern data creation part 112 includes a pattern data creation part 112a and a rearrangement part 112b. The random number generation part 71 and the specific information storage part 76 are configured to be the same as those in the first exemplary embodiment.

The first pattern data creation part 111 creates pattern data on the basis of a random number from the random number generation part 71.

The pattern data creation part 112a of the second pattern data creation part 112 creates plural pattern data on the basis of the specific information of the printer unit 1 read out from the specific information storage part 76. Then, the rearrangement part 112b of the second pattern data creation part 112 rearranges the plural pattern data in a predetermined rearranging procedure, on the basis of the random number from the random number generation part 71.

The code image creation part 113 creates a code image on the basis of the pattern data created by the first pattern data creation part 111 and rearranged plural pattern data created and rearranged by the second pattern data creation part 112 and outputs the code image.

Figure 8A:
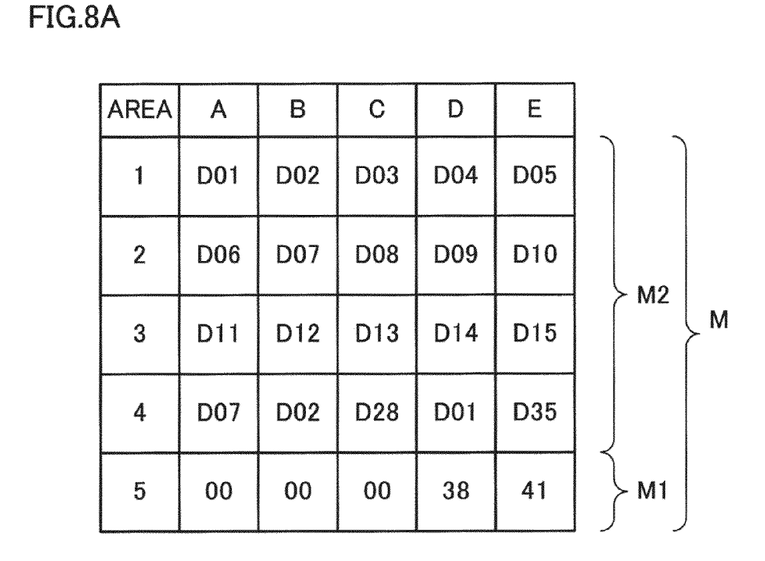
FIGS. 8A and 8B are diagrams for explaining an example of code data generation in the code data creation portion.
Figure 8B:
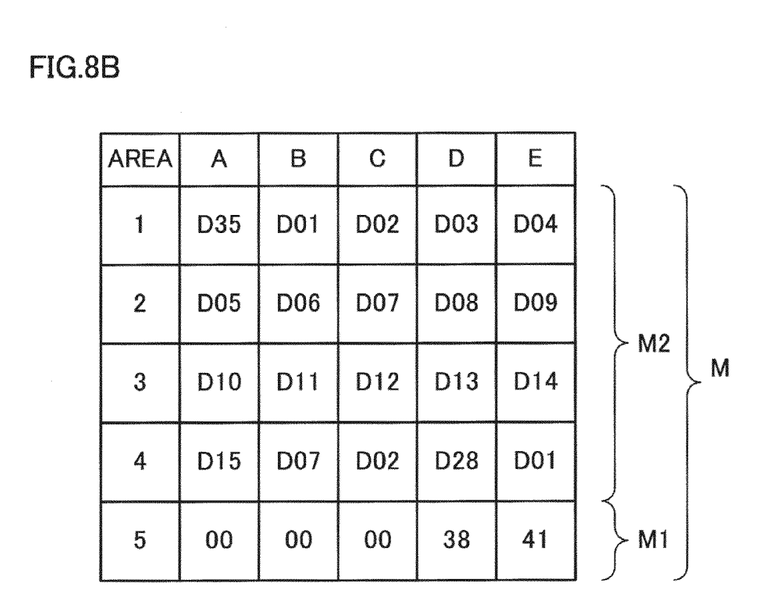

FIGS. 8A and 8B are diagrams for explaining an example of code data creation in the code data creation portion 52.

Here, a forming area of a first mark M1 is configured by five blocks of 5A to 5E. To the five blocks that configure the first mark M1, pattern data configured by a random number are assigned. For example, when a random number "0000003841" is generated by the random number generation part 71, "00" is assigned to each of areas 5A to 5C, "38" is assigned to the area 5D, and "41" is assigned to the area 5E.

On the other hand, a forming area of a second mark M2 is configured by twenty blocks of 1A to 1E, 2A to 2E, 3A to 3E and 4A to 4E. To the twenty blocks that configure the second mark M2, pattern data including the specific information are assigned.

Specifically, in the twenty blocks that configure the second mark M2, to the areas 1A to 1E, data D01 to D05 that indicate a division code are assigned respectively, and to the areas 2A to 2E, data D6 to D10 that indicate an installation place are assigned respectively. Further, to the areas 3A to 3E, data D11 to D15 that indicate a maker are assigned respectively. Furthermore, to the areas 4A to 4E, information on printed time is assigned respectively. It should be noted that, in the second exemplary embodiment, to the areas 4A, 4B, 4C, 4D and 4E, a year, a month, a day, an hour and a minute are assigned respectively.

For example, when a random number "0000003841" is generated in the random number generation part 71, the first pattern data creation part 111 creates pattern data "00," "00," "00," "38" and "41" on the basis of the random number. Subsequently, the pattern data creation part 112a of the second pattern data creation part 112 creates twenty pattern data on the basis of specific information read out from the specific information storage part 76, that is, a division code, an installation place, a maker and printed time. The twenty pattern data include five data on each of the four kinds of information. Then, the rearrangement part 112b of the second pattern data creation part 112 rearranges twenty pattern data, while focusing a value of a last digit of the above-mentioned random number, for example.

In the second exemplary embodiment, since the value of the last digit is one (1), the rearrangement part 112b decides (sets) a shift amount of each of pattern data in the twenty blocks that configure the second mark M2 to be plus one (+1), and causes the respective pattern data to be shifted by +1 in the right direction in sequence. It should be noted that, for example, pattern data that are unable to be shifted on the first row are moved to the topmost position on the second row. Similarly, pattern data on the second row and the third row are shifted. Further, pattern data that are unable to be shifted on the fourth row are moved to the topmost position on the first row.

As a result of this, as shown in FIG. 8B, the data D35 that indicate the printed time (minute) are arranged on the area 1A, the data D01 to D0S that indicate the division code are arranged on the areas 1B to 1E and 2A, the data D06 to D10 that indicate the installation place are arranged on the areas 2B to 2E and 3A, the data D11 to D15 that indicate the maker are arranged to the areas 3B to 3E and 4A, and the remaining data D07, D02, D28 and D01 that indicate the printed time are arranged on the areas 4B to 4E. As a result of this, for example, on the areas (the areas 1A to 1E) where information on the division code is assigned before the shift, information that is different from that before the shift is arranged.

In the second exemplary embodiment, a code image on the basis of the code data shown in FIG. 8B is created and outputted by the code image creation part 113, and, based on this, the code image M shown in FIG. 4 is formed.

It should be noted that, in this example, the shift amount is set to +1 on the basis of the value of the last digit "1." However, the shift amount may be set by using a value of the second last digit "4" or the third last digit "8." Further, the shift amount may be set by performing a multiplication, division, addition, subtraction or the like of the predetermined number for the acquired random number. In addition, in the second exemplary embodiment, the shift direction is the right direction. However, the left direction, the downward direction or the upward direction may be acceptable. In the second exemplary embodiment, a part of the random number (a specific part) is used. However, all digits of the random number may be used.

Figure 9:
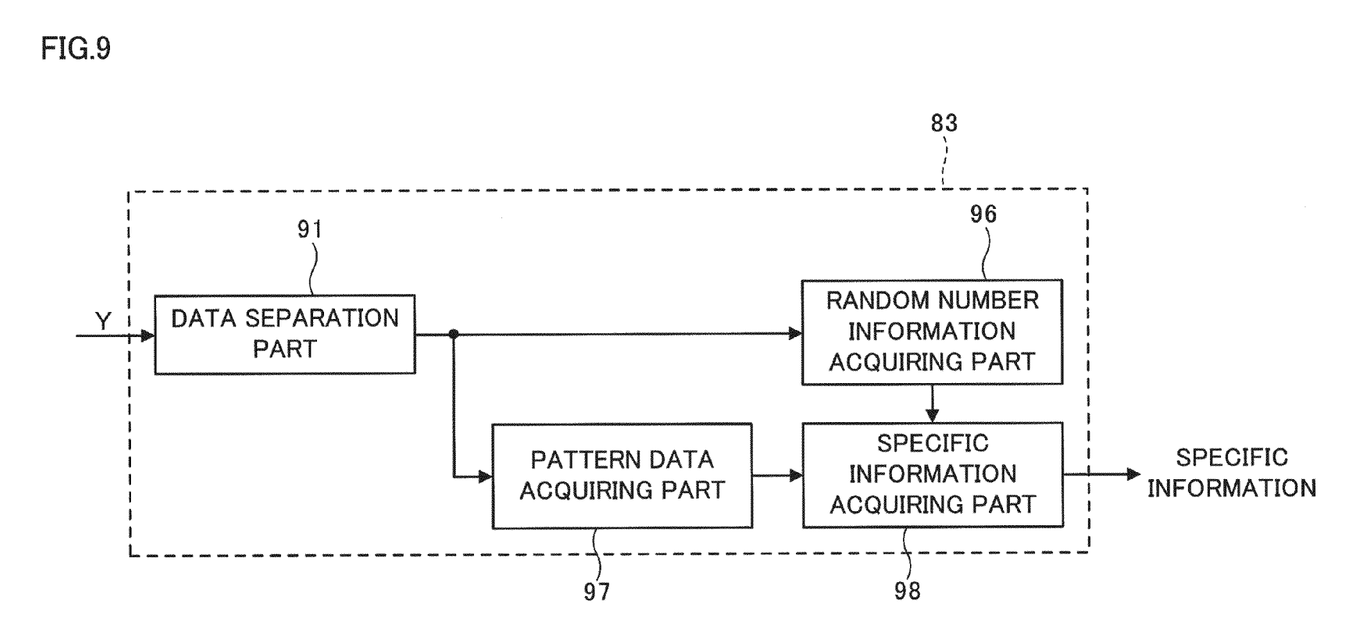
FIG. 9 illustrates a block diagram of the code data analysis part in the second exemplary embodiment.

Here, also in the second exemplary embodiment, by using the above-mentioned scanner unit 60 or the like, specific information may be acquired, and the acquired specific information may be displayed on the display or the like. FIG. 9 illustrates a block diagram of the code data analysis part 83 in the second exemplary embodiment. It should be noted that, since the reading portion 61, and the read-out image processing part 81 and the color conversion part 82 of the reading processing portion 62 are similar to those in the first exemplary embodiment, the description thereof is omitted. The code data analysis part 83 in the second exemplary embodiment is provided with a data separation part 91, a random number information acquiring part 96, a pattern data acquiring part 97 and a specific information acquiring part 98.

The data separation part 91 separates code data included in the yellow (y) image data that has been inputted, that is, the data of the code image M (including the first mark M1 and the second mark M2), and outputs the code data, similarly to the first exemplary embodiment.

The random number information acquiring part 96 acquires a random number from code data that have been inputted (specifically, the data of the first mark M1).

The pattern data acquiring part 97 acquires rearranged plural pattern data that have been rearranged by the rearrangement part 112b of the above-mentioned second pattern data creation part 112 from the code data that have been inputted (specifically, the data of the second mark M2).

The specific information acquiring part 98 rearranges plural rearranged pattern data acquired by the pattern data acquiring part 97 on the basis of the random number acquired by the random number information acquiring part 96, and thereby the specific information acquiring part 98 acquires specific information, and outputs the acquired specific information. Here, the rearrangement of the rearranged pattern data by the specific information acquiring part 98 is described in detail. The specific information acquiring part 98 rearranges the rearranged plural pattern data that have been inputted, in a procedure opposite to the rearranging procedure for the rearrangement of the pattern data by the above-mentioned rearrangement part 112b, on the basis of the random number acquired by the random number information acquiring part 96. More specifically, the rearranged pattern data are shifted in the direction opposite to the shift direction at the rearrangement of the pattern data by the above-mentioned rearrangement part 112b with the same shift amount as that at the rearrangement of the pattern data by the above-mentioned rearrangement part 112b.

Here, the operation of the code data analysis part 83 will be specifically described.

In the code data analysis part 83, after the data separation part 91 separates the code data from the yellow image data, the random number information acquiring part 96 acquires the random number from the code data (specifically, the data of the first mark M1), and outputs the acquired random number to the specific information acquiring part 98. The pattern data acquiring part 97 acquires plural rearranged pattern data that have been rearranged by the rearrangement part 112b of the above-mentioned second pattern data creation part 112 from the code data separated by the data separation part 91 (specifically, the data of the second mark M2) and outputs the acquired plural rearranged pattern data to the specific information acquiring part 98. Then, the specific information acquiring part 98 executes the procedure opposite to the rearrangement procedure for the rearrangement of the pattern data by the above-mentioned rearrangement part 112b, on the basis of the acquired random number, rearranges the plural rearranged pattern data inputted from the pattern data acquiring unit 97, and acquires the specific information. Thereafter, the specific information acquiring part 98 outputs the acquired specific information to the UI 70.

For example, in the case where the acquired random number is "0000003841", the specific information acquiring part 98 causes each of the plural rearranged pattern data to be shifted by minus one (−1) in the left direction, on the basis of the value of the last digit "1" of the random number. Then, the specific information acquiring part 98 acquires the specific information from the plural pattern data after the shift, and outputs the acquired specific information to the UI 70. The UI 70 displays the specific information that has been inputted, on the display or the like. In this way, also in the second exemplary embodiment, various kinds of information (in the second exemplary embodiment, the division code, the installation place, the manufacturer, the printed time) of the image forming apparatus outputting the printed material (for example, the printer unit 1) is to be acquired.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a random number information generation part that generates random number information;
a first pattern data creation part that creates random pattern data from the random number information generated by the random number information generation part;
a second pattern data creation part that creates a plurality of pattern data from specific information for identifying the apparatus and sequentially shifts the plurality of pattern data by a random shifting value that is decided using at least one digit of the random number information generated by the random number information generation part;
a code data creation part that creates code data including the random pattern data created by the first pattern data creation part and the plurality of shifted pattern data shifted by the second pattern data creation part; and
an image forming part that forms a code image based on the code data created by the code data creation part on a recording medium.

2. A non-transitory computer readable medium storing a program causing a computer to execute a process for creating code data, the process comprising:
generating random number information;
creating random pattern data from the random number information as a first pattern data creation process;
creating a plurality of pattern data from specific information for identifying an image forming apparatus and sequentially shifting the plurality of pattern data by a random shifting value that is decided using at least one digit of the random number information as a second pattern data creation process; and
creating code data including the random pattern data created in the first pattern data creation process and the plurality of shifted pattern data shifted in the second pattern data creation process.

3. The image forming apparatus according to claim 1, wherein the at least one digit in the random number information is one of a last digit of the random number information, a second to last digit of the random number information, and a third to last digit of the random number information.

4. The image forming apparatus according to claim 1, wherein the plurality of pattern data created by the second pattern data creation part is arranged by rows or columns and sequentially shifted along the rows or the columns in a way that the pattern data reaching an end of a current row or an end of a current column is moved to a next row or a next column, and the pattern data reaching an end of a last row or an end of a last column is moved to a first row or a first column.

5. The image forming apparatus according to claim 1, wherein the specific information for identifying the apparatus includes information of an installation place of the apparatus, which is acquired by a global positioning system (GPS).

* * * * *